(12) United States Patent
Carr et al.

(10) Patent No.: US 11,041,392 B2
(45) Date of Patent: Jun. 22, 2021

(54) ATTACHMENT FACES FOR CLAMPED TURBINE STATOR OF A GAS TURBINE ENGINE

(71) Applicant: United Technologies Corporation, Farmington, CT (US)

(72) Inventors: Jesse M. Carr, Hartford, CT (US); Bryan P. Dube, Columbia, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 210 days.

(21) Appl. No.: 15/712,892

(22) Filed: Sep. 22, 2017

(65) Prior Publication Data

US 2018/0010473 A1     Jan. 11, 2018

Related U.S. Application Data

(63) Continuation of application No. 14/841,943, filed on Sep. 1, 2015, now Pat. No. 9,816,387.

(60) Provisional application No. 62/047,710, filed on Sep. 9, 2014.

(51) Int. Cl.
| | |
|---|---|
| F01D 9/04 | (2006.01) |
| F01D 25/24 | (2006.01) |
| F04D 29/64 | (2006.01) |
| F04D 29/54 | (2006.01) |

(52) U.S. Cl.
CPC ............ *F01D 9/042* (2013.01); *F01D 9/041* (2013.01); *F01D 25/246* (2013.01); *F04D 29/542* (2013.01); *F04D 29/644* (2013.01); *F05D 2230/51* (2013.01); *F05D 2260/30* (2013.01); *Y02T 50/60* (2013.01)

(58) Field of Classification Search
CPC . F01D 9/04; F01D 9/042; F01D 9/041; F01D 25/28; F01D 25/243; F01D 25/246; F02C 3/04; F05D 2220/32; F05D 2240/12; F05D 2240/80; F05D 2230/51; F05D 2260/30; F04D 29/542; F04D 29/644; Y02T 50/673
See application file for complete search history.

(56) References Cited

U.S. PATENT DOCUMENTS

| | | | |
|---|---|---|---|
| 2,605,997 | A | 8/1952 | Lombard et al. |
| 5,788,456 | A | 8/1998 | Maier |
| 6,179,560 | B1 | 1/2001 | Kouris et al. |
| 6,217,282 | B1 | 4/2001 | Stanka |
| 6,220,815 | B1 | 4/2001 | Rainous et al. |
| 6,347,508 | B1 | 2/2002 | Smallwood et al. |

(Continued)

FOREIGN PATENT DOCUMENTS

| | | |
|---|---|---|
| CN | 101424196 A | 5/2009 |
| CN | 102046921 A | 5/2011 |

(Continued)

*Primary Examiner* — Brian P Wolcott
*Assistant Examiner* — Justin A Pruitt
(74) *Attorney, Agent, or Firm* — Bachman & LaPointe, P.C.

(57) ABSTRACT

An airfoil fairing shell for a gas turbine engine includes an airfoil section between an outer vane endwall and an inner vane endwall, at least one of the outer vane endwall and the inner vane endwall including a radial attachment face, a suction side tangential attachment face, a pressure side tangential attachment face, and an axial attachment face.

24 Claims, 11 Drawing Sheets

(56) References Cited

U.S. PATENT DOCUMENTS

| | | |
|---|---|---|
| 6,364,606 B1 | 4/2002 | Rice et al. |
| 6,422,812 B1 | 7/2002 | Pepi et al. |
| 6,428,272 B1 | 8/2002 | Pepi et al. |
| 6,572,331 B1 | 6/2003 | Mohammed-Fakir et al. |
| 6,595,745 B1 | 7/2003 | Mohammed-Fakir et al. |
| 6,969,239 B2 | 11/2005 | Grant et al. |
| 7,040,098 B2 | 5/2006 | Lepretre et al. |
| 7,063,505 B2 | 6/2006 | Czachor |
| 7,101,150 B2 | 9/2006 | Bash et al. |
| 7,290,983 B2 | 11/2007 | Tiemann |
| 7,300,237 B2 | 11/2007 | Illedits et al. |
| 7,329,087 B2 | 2/2008 | Cairo et al. |
| 7,416,362 B2 | 8/2008 | North |
| 7,794,203 B2 | 9/2010 | Drelon et al. |
| 7,900,461 B2 | 3/2011 | Varney et al. |
| 7,926,286 B2 | 4/2011 | Morenko et al. |
| 8,070,427 B2 | 12/2011 | Snook et al. |
| 8,142,152 B2 | 3/2012 | Drelon et al. |
| 8,167,546 B2 | 5/2012 | Shi et al. |
| 8,360,716 B2 | 1/2013 | Bergman et al. |
| 8,443,514 B2 | 5/2013 | Bertino |
| 8,753,075 B2 | 6/2014 | Rice et al. |
| 8,757,919 B2 | 6/2014 | Samuelsson et al. |
| 9,039,351 B2 | 5/2015 | Belmonte et al. |
| 2009/0191053 A1 | 7/2009 | Bridges et al. |
| 2010/0126013 A1 | 5/2010 | Bertino |
| 2011/0299917 A1 | 12/2011 | Samuelsson et al. |
| 2011/0305560 A1 | 12/2011 | Belmonte et al. |
| 2012/0020782 A1 | 1/2012 | Rice et al. |
| 2012/0070302 A1 | 3/2012 | Lee |
| 2012/0168601 A1 | 7/2012 | Cant et al. |
| 2013/0121813 A1 | 5/2013 | Damgaard et al. |
| 2013/0139514 A1 | 6/2013 | Varney et al. |
| 2014/0001285 A1* | 1/2014 | Grooms, III .............. F01D 5/18 239/265.11 |

FOREIGN PATENT DOCUMENTS

| | | |
|---|---|---|
| EP | 1106784 A2 | 6/2001 |
| EP | 1520957 A1 | 4/2005 |
| EP | 1764481 A2 | 3/2007 |
| EP | 1950392 A1 | 7/2008 |
| EP | 1965042 A1 | 9/2008 |
| WO | 2004057158 A1 | 7/2004 |
| WO | 2006100256 A1 | 9/2006 |

* cited by examiner

ATTACHMENT FACES FOR CLAMPED TURBINE STATOR OF A GAS TURBINE ENGINE

CROSS-REFERENCE TO RELATED APPLICATIONS

This application is a Continuation of U.S. patent application Ser. No. 14/841,943, filed Sep. 1, 2015, which claims the benefit of U.S. patent application Ser. No. 62/047,710, filed Sep. 9, 2014.

BACKGROUND

The present disclosure relates to airfoil components for a gas turbine engine, and more particularly, to attachment faces for a turbine stator which itself has an airfoil with endwall platforms and which is radially compressed between supporting structural details.

Gas turbine engines, such as those that power modern commercial and military aircraft, generally include a compressor to pressurize an airflow, a combustor to burn a hydrocarbon fuel in the presence of the pressurized air, and a turbine to extract energy from the resultant combustion gases. The compressor and turbine sections include rotatable blade and stationary vane arrays. The blades and vanes typically include low and high-pressure airfoils, vanes, vane rings, shrouds, and nozzle segments.

The stationary vane arrays are typically assembled between outer and inner shrouds, or rings, in a variety of manners. Although the actual elements may vary in their configuration and construction, one similarity is that the vanes are typically constructed to allow for thermal expansion. The thermal expansion is typically accommodated through assembly of the vanes relatively loosely in the inner and outer shrouds. Although effective, such assembly may result in various stresses.

SUMMARY

An airfoil fairing shell for a gas turbine engine according to one disclosed non-limiting embodiment of the present disclosure includes an airfoil section between an outer vane endwall and an inner vane endwall, at least one of the outer vane endwall and the inner vane endwall including a radial attachment face, a suction side tangential attachment face, a pressure side tangential attachment face, and an axial attachment face.

A further embodiment of the present disclosure includes, wherein the radial attachment face, the suction side tangential attachment face, the pressure side tangential attachment face, and the axial attachment face are formed by a thickened region of at least one of the outer vane endwall and the inner vane endwall.

A further embodiment of any of the foregoing embodiments of the present disclosure includes, wherein the radial attachment face, the suction side tangential attachment face, the pressure side tangential attachment face, and the axial attachment face are formed by a thickened region of the inner vane endwall.

A further embodiment of any of the foregoing embodiments of the present disclosure includes, wherein the suction side tangential attachment face is parallel to the tangential attachment face.

A further embodiment of any of the foregoing embodiments of the present disclosure includes, wherein the suction side tangential attachment face and the pressure side tangential attachment face are non-parallel to the inner vane endwall.

A further embodiment of any of the foregoing embodiments of the present disclosure includes, wherein the suction side tangential attachment face and the pressure side tangential attachment face are non-parallel.

A further embodiment of any of the foregoing embodiments of the present disclosure includes, wherein the suction side tangential attachment face is generally perpendicular to a resultant aerodynamic load generated by the airfoil.

A further embodiment of any of the foregoing embodiments of the present disclosure includes, wherein the suction side tangential attachment face is downstream of an aerodynamic center of a resultant aerodynamic load generated by the airfoil.

A further embodiment of any of the foregoing embodiments of the present disclosure includes, wherein the suction side tangential attachment face is aligned with respect to a resultant aerodynamic load generated by the airfoil.

A vane ring for a gas turbine engine according to another disclosed non-limiting embodiment of the present disclosure includes a multiple of airfoil fairing shells each with a first attachment face formed by a thickened region of a vane endwall that forms a mateface, each of the multiple of airfoil fairing shells adjacent to another one of the multiple of airfoil fairing shells at the mateface; and a structural support with a multiple of lugs, each of the multiple of lugs interfaces with at least one of the first attachment faces of each of the multiple of airfoil fairing shells.

A further embodiment of any of the foregoing embodiments of the present disclosure includes, wherein the structural support includes an interface for attachment to an engine case structure.

A further embodiment of any of the foregoing embodiments of the present disclosure includes, wherein the structural support is an arcuate segment.

A further embodiment of any of the foregoing embodiments of the present disclosure includes, wherein the structural support is a full ring.

A further embodiment of any of the foregoing embodiments of the present disclosure includes, wherein the lug extends transverse to the mateface of the vane endwall.

A further embodiment of any of the foregoing embodiments of the present disclosure includes, wherein the thickened region of the vane endwall forms a radial attachment face, an axial attachment face, and a pressure side tangential attachment face.

A further embodiment of any of the foregoing embodiments of the present disclosure includes, wherein the first attachment face is a suction side tangential attachment face.

A further embodiment of any of the foregoing embodiments of the present disclosure includes, wherein the axial attachment face, the pressure side tangential attachment face, and the suction side tangential attachment face are generally perpendicular to the radial attachment face.

A further embodiment of any of the foregoing embodiments of the present disclosure includes, wherein the axial attachment face, is generally perpendicular to the pressure side tangential attachment face and the suction side tangential attachment face.

A further embodiment of any of the foregoing embodiments of the present disclosure includes, wherein the suction side tangential attachment face is downstream of an aerodynamic center of a resultant aerodynamic load generated by the airfoil fairing shell such that the in plane loading to the reaction forces on these faces is compressive.

A further embodiment of any of the foregoing embodiments of the present disclosure includes, wherein the suction side tangential attachment face and the axial attachment face are downstream of an aerodynamic center of a resultant aerodynamic load generated by the airfoil fairing shell such that the in plane loading to the reaction forces on these faces is compressive.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
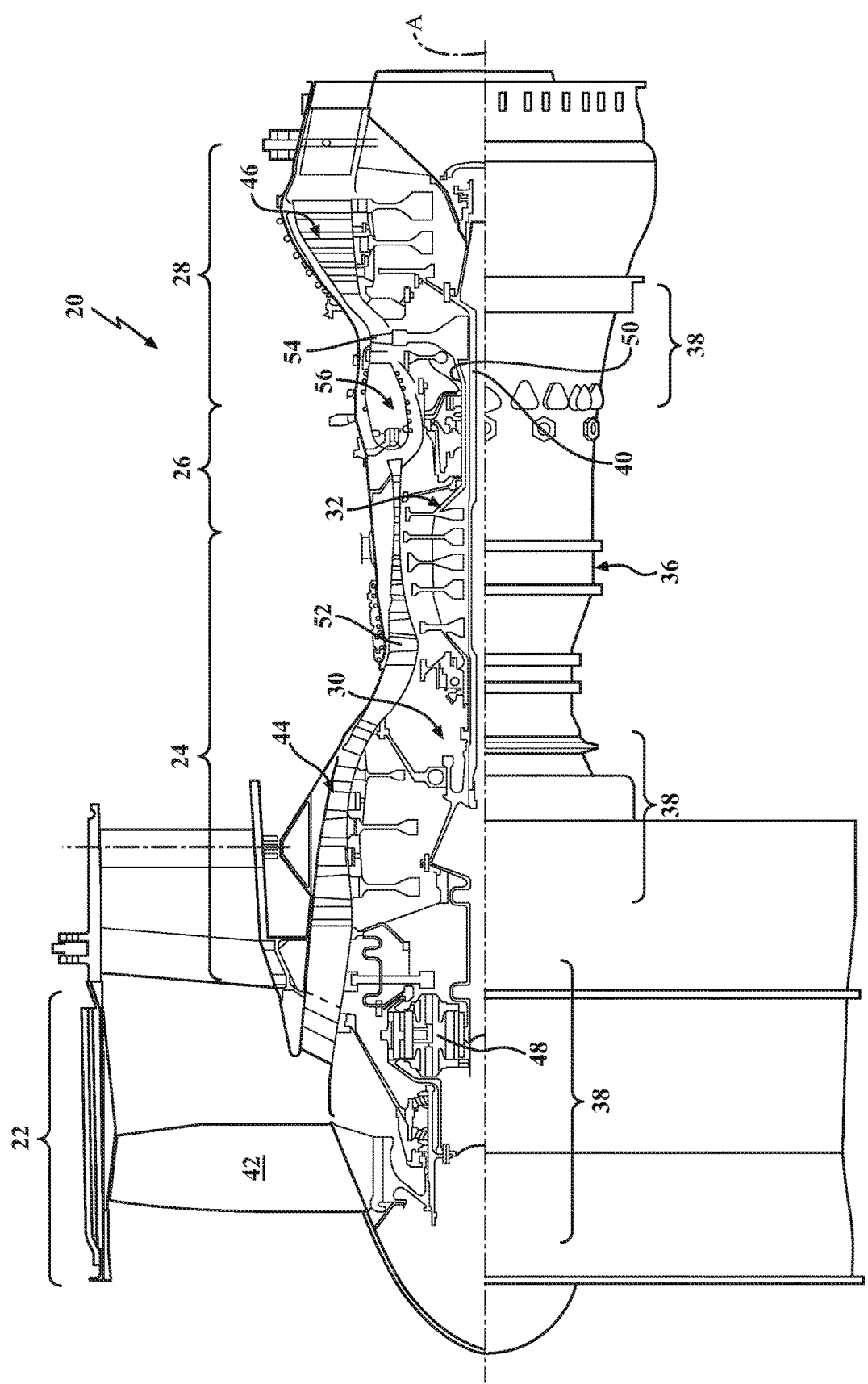
FIG. 1 is a schematic cross-section of an example gas turbine engine architecture.
Figure 2:
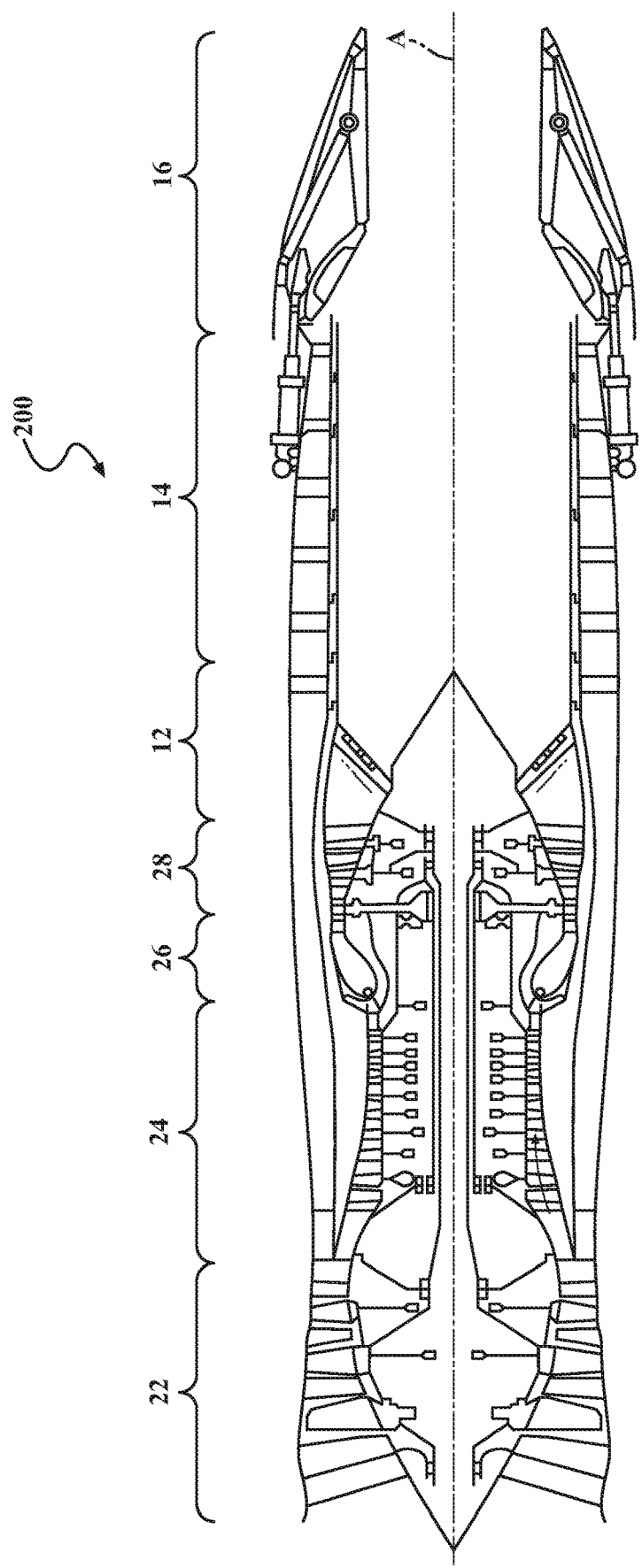
FIG. 2 is a schematic cross-section of another example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26, and a turbine section 28. Alternative engine architectures 200 might include an augmentor section 12, an exhaust duct section 14, and a nozzle section 16 (FIG. 2) among other systems or features. The fan section 22 drives air along a bypass flowpath and into the compressor section 24 to drive core air along a core flowpath. The core air is compressed then communicated into the combustor section 26 for downstream expansion through the turbine section 28. Although depicted as a turbofan in the disclosed non-limiting embodiment, it should be appreciated that the concepts described herein are not limited, only to turbofans as the teachings may be applied to other types of turbine engine architectures such as turbojets, turboshafts, and three-spool (plus fan) turbofans.

The engine 20 generally includes a low spool 30 and a high spool 32 mounted for rotation about an engine central longitudinal axis A relative to an engine case structure 36 via several bearing compartments 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 a and high pressure turbine ("HPT") 54. A combustor 56 is arranged between the HPC 52 and the HPT 54. Core airflow is compressed by the LPC 44, then the HPC 52, mixed with the fuel and burned in the combustor 56, then expanded over the HPT 54 and the LPT 46 which rotationally drive the respective low spool 30 and high spool 32 in response to the expansion.

Figure 3:
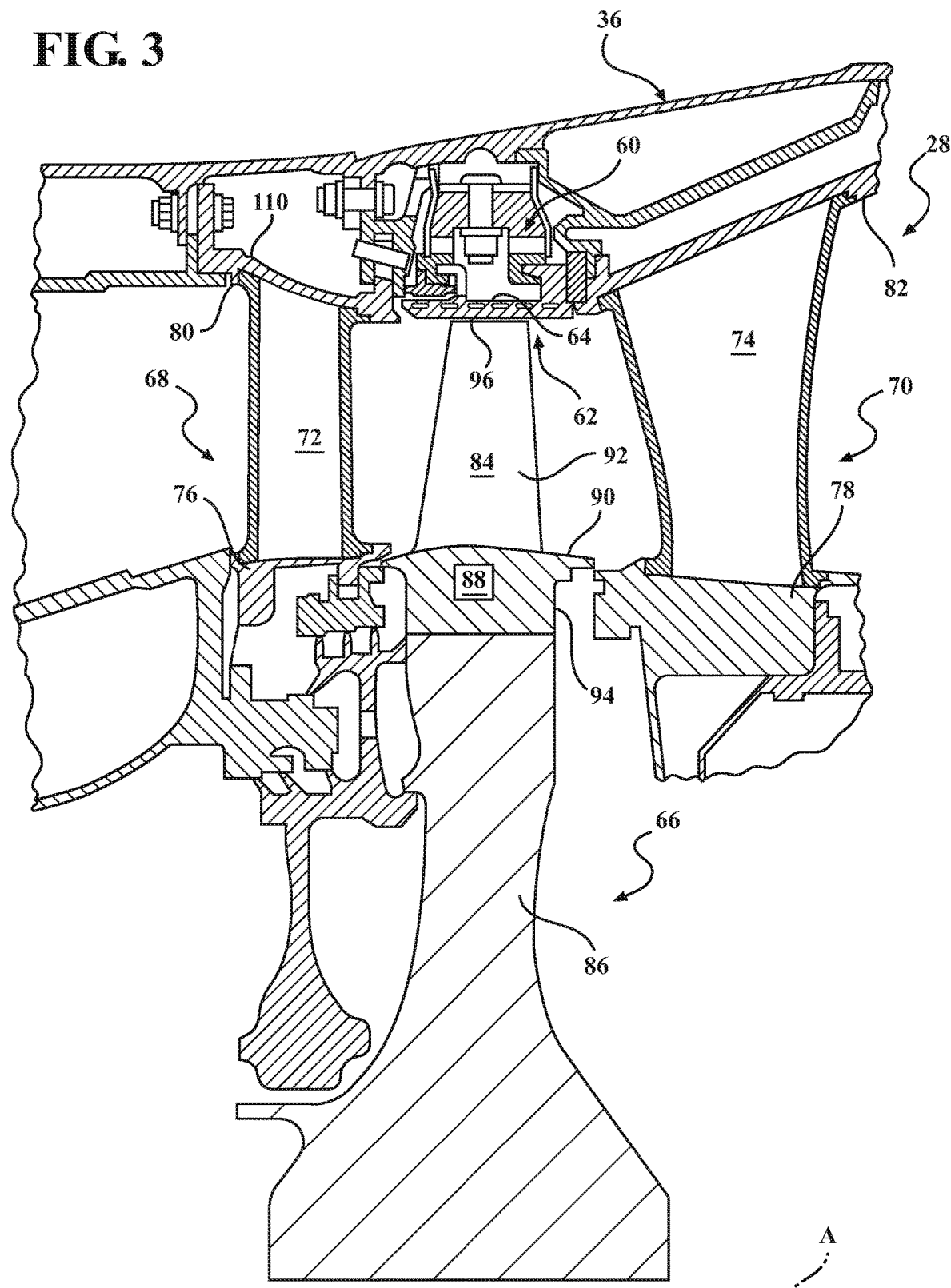
FIG. 3 is an enlarged schematic cross-section of an engine turbine section.

With reference to FIG. 3, an enlarged schematic view of a portion of the HPT 54 is shown by way of example; however, other engine sections will also benefit herefrom. A shroud assembly 60 mounted to the engine case structure 36 supports a Blade Outer Air Seal (BOAS) assembly 62 with a multiple of circumferentially distributed BOAS 64 proximate to a rotor assembly 66 (one schematically shown).

The shroud assembly 60 and the BOAS assembly 62 are axially disposed between a forward stationary vane ring 68 and an aft stationary vane ring 70. The rotor assembly 66 includes an array of blades 84 circumferentially disposed around a disk 86. Each blade 84 includes a root 88, a platform 90, and an airfoil 92. The blade roots 88 are received within a rim 94 of the disk 86 and the airfoils 92 extend radially outward such that a tip 96 of each airfoil 92 adjacent to the blade outer air seal (BOAS) assembly 62. The platform 90 separates a gas path side inclusive of the airfoil 92 and a non-gas path side inclusive of the root 88.

Figure 4:
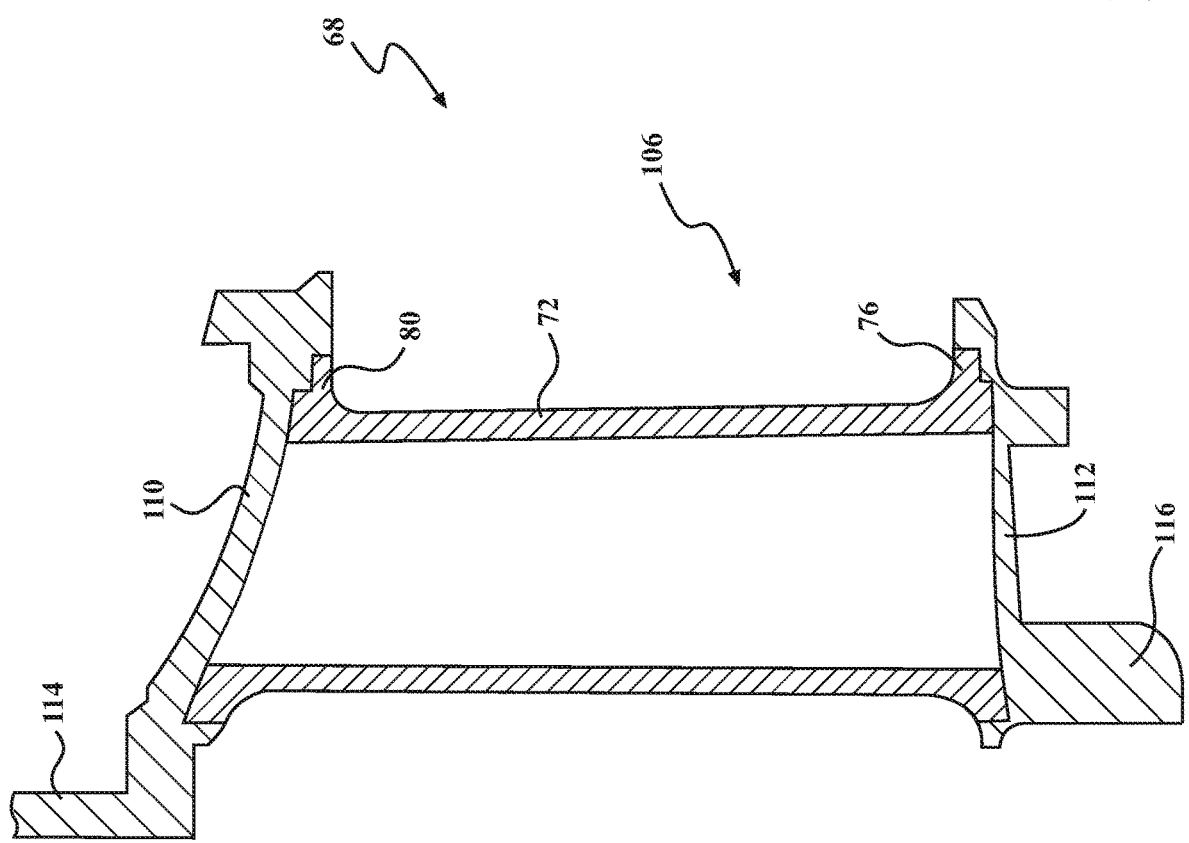
FIG. 4 is an enlarged schematic cross-section of an engine turbine section airfoil fairing shell according to one disclosed non-limiting embodiment.
Figure 5:
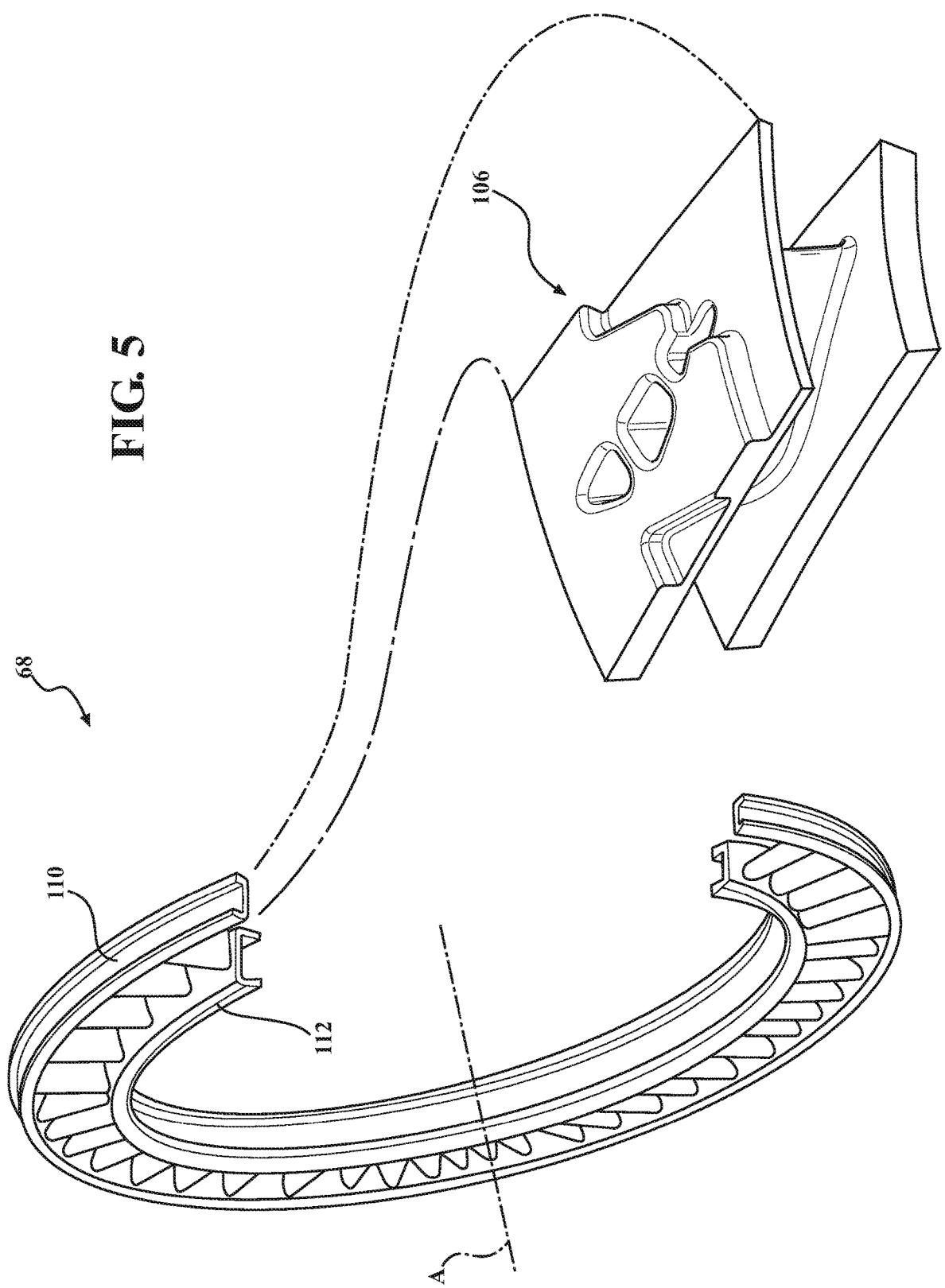
FIG. 5 is a perspective view of turbine vane ring.

With reference to FIG. 4, the forward stationary vane ring 68 will be described as a clamped stator assembly, however, it should be appreciated that the aft stationary vane ring 70 as well as other vane rings in the turbine section and the compressor section will also benefit herefrom. In the example forward stationary vane ring 68, each airfoil 72 extends between a respective inner vane endwall 76 and an outer vane endwall 80 to form an airfoil fairing shell 106. Each airfoil fairing shell 106 is respectively clamped between an outer structural support 110, and an inner structural support 112 (also shown in FIG. 5).

The outer structural support 110, and the inner structural support 112 may be full rings or circumferentially segmented structures that are mounted within or a portion of the engine case structure 36, or attached thereto via fasteners, clamping, pins, or other such interface 114, 116 (illustrated schematically). That is, the airfoil fairing shells 106 are clamped into a full ring or circumferentially segmented outer and inner structural support 110, 112 that are, in turn, formed, fastened or otherwise located in the engine case structure 36 (FIG. 3). In the example circumferentially segmented structure, each segment of the outer structural support 110 and/or the inner structural support 112 may support a cluster of one or more airfoil fairing shells 106 (three shown in FIG. 6).

Figure 7:
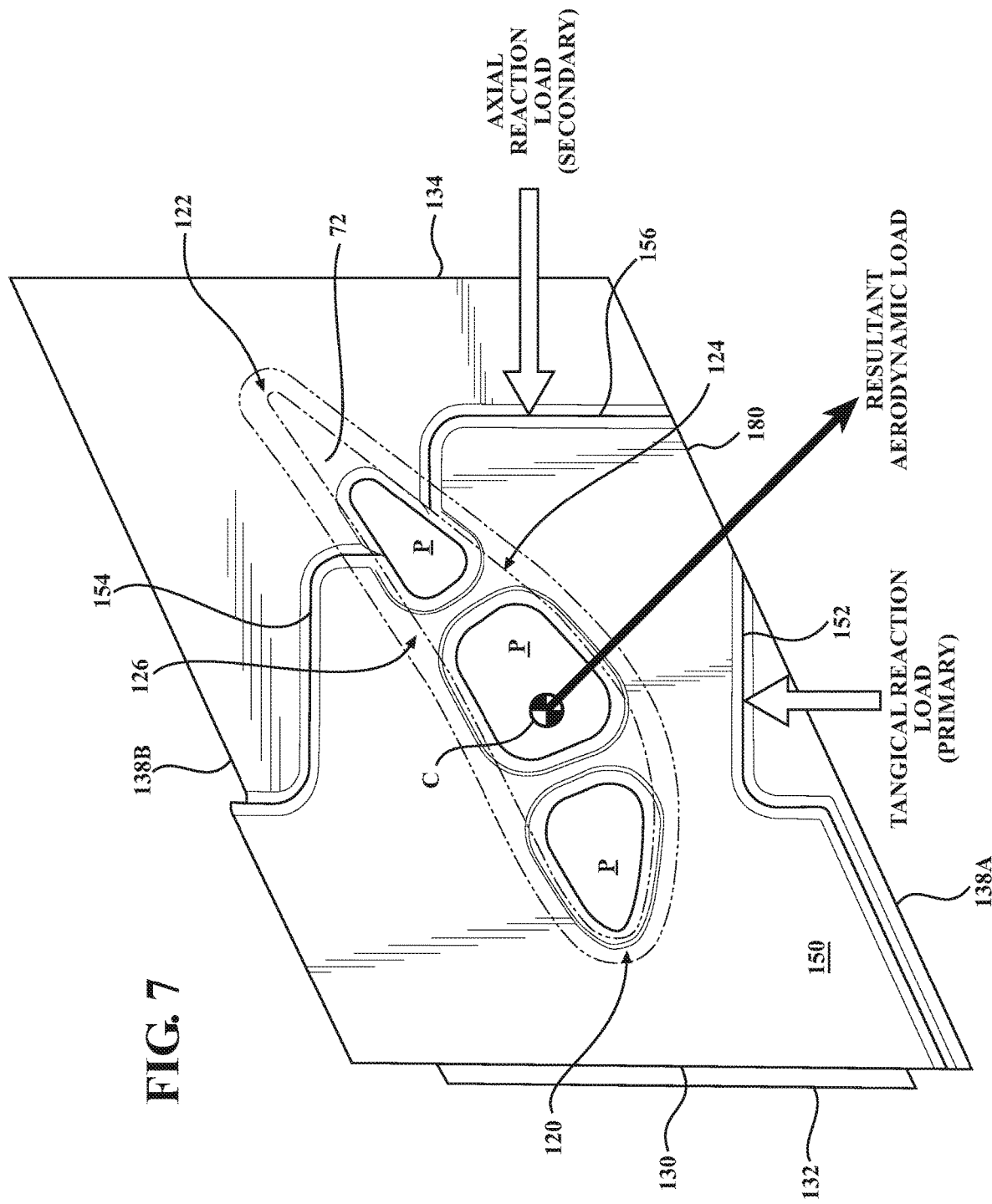
FIG. 7 is a top partial phantom view of an airfoil fairing shell according to another disclosed non-limiting embodiment.
Figure 8:
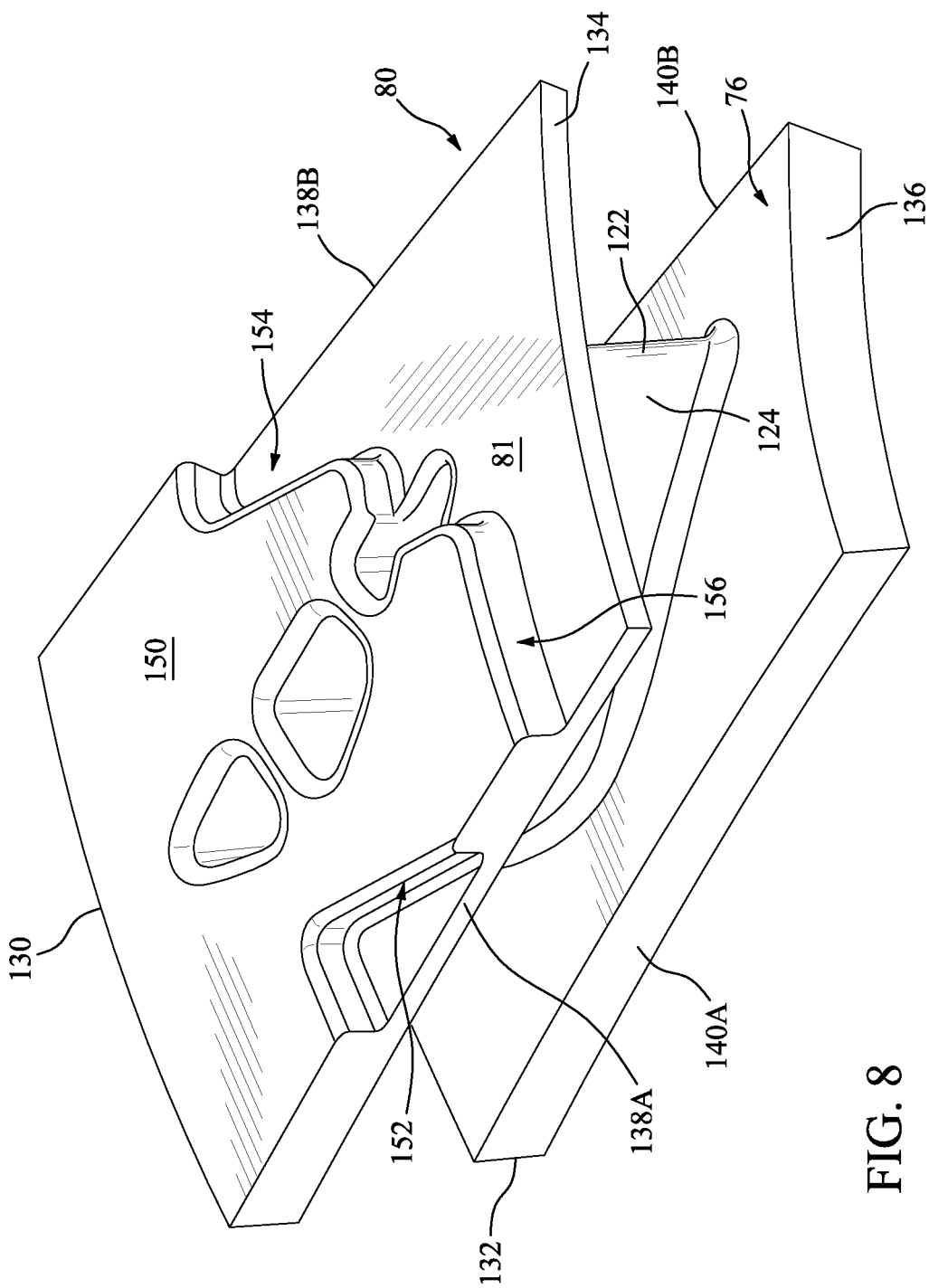
FIG. 8 is a top partial phantom view of an airfoil fairing shell according to another disclosed non-limiting embodiment.

With reference to FIG. 7, each airfoil 72 defines a blade chord between a leading edge 120, which may include various forward and/or aft sweep configurations, and a trailing edge 122. A first airfoil sidewall 124 that may be convex to define a suction side, and a second airfoil sidewall 126 that may be concave to define a pressure side, are joined at the leading edge 120 and at the axially spaced trailing edge 122. An aerodynamic center "C" of the airfoil is located at about a quarter chord position, however, such aerodynamic centers may vary dependent upon the airfoil.

The inner vane endwall 76 and the outer vane endwall 80 are generally a parallelogram, chevron, arc, or other shape when viewed from the top and generally includes a respective forward edge 130, 132, an aft edge 134, 136 and a mateface 138A, 138B, 140A, 140B therebetween. The endwalls 70, 80 may be cylindrical, conical, arbitrary axisymmetric, or non-axisymmetric when viewed in cross-section. The non-gaspath face of the platform may be any of these as well. That is, the airfoil 72, the inner vane endwall 76, and the outer vane endwall 80 form the airfoil fairing shell 106 that is radially clamped by the outer structural support 110, and the inner structural support 112.

The airfoil fairing shell 106 may include passages "P" (three shown) for cooling airflow and or electrical conduits, may be solid, may be hollow, or combinations thereof. Such an arrangement facilitates manufacture of metallic or non-metallic airfoil fairing shells, particularly but not exclusively those of low-ductility and/or low coefficient of thermal expansion materials, that are readily assembled to the outer structural support and the inner structural support which, in turn, are manufactured of metallic or non-metallic material and which may be manufactured from the same material as or dissimilar material to the airfoil fairing shells.

In this disclosed non-limiting embodiment, the outer vane endwall 80 will be described, however, it should be appreciated that the inner vane endwall 76 as well as other vane rings will also benefit herefrom. The outer vane endwall 80 generally includes a radial attachment face 150 spaced from an inner face 81, a suction side tangential attachment face 152, a pressure side tangential attachment face 154, and an axial attachment face 156. The suction side tangential attachment face 152, the pressure side tangential attachment face 154, and the axial attachment face 156 extends from the inner face 81 to the radial attachment face 150 to form a stepped surface. The attachment faces 150, 152, 154, 156 transmit axial and tangential aerodynamic loads from the airfoil fairing shell 106 into the structural supports and transmit clamping load through the fairing shell.

The airfoil fairing shell 106 include cylindrical, conical, arbitrary axisymmetric or planar radial attachment faces through which the spanwise clamping load is generally transmitted, and two pairs of orthogonal planar attachment faces through which aerodynamic loads and retention loads are generally transmitted, and which are quasi-orthogonal to the radial direction at the airfoil's circumferential station. It should be appreciated that one attachment face may be the primary attachment face while another attachment face is a secondary attachment face with respect configurations where the faces are rotated with respect to the engine axis. Axial and tangential oriented primary and secondary attachment faces are one disclosed non-limiting embodiment. More generally, primary and secondary attachment faces, where axial and tangentially aligned are one specific type, where primary aligned with the resultant load is another specific type, and where primary aligned with the platform mateface edge is a third type. The primary and secondary are orthogonal to one another, and are quasi-orthogonal to the radial direction at the airfoil's circumferential station.

Figure 6:
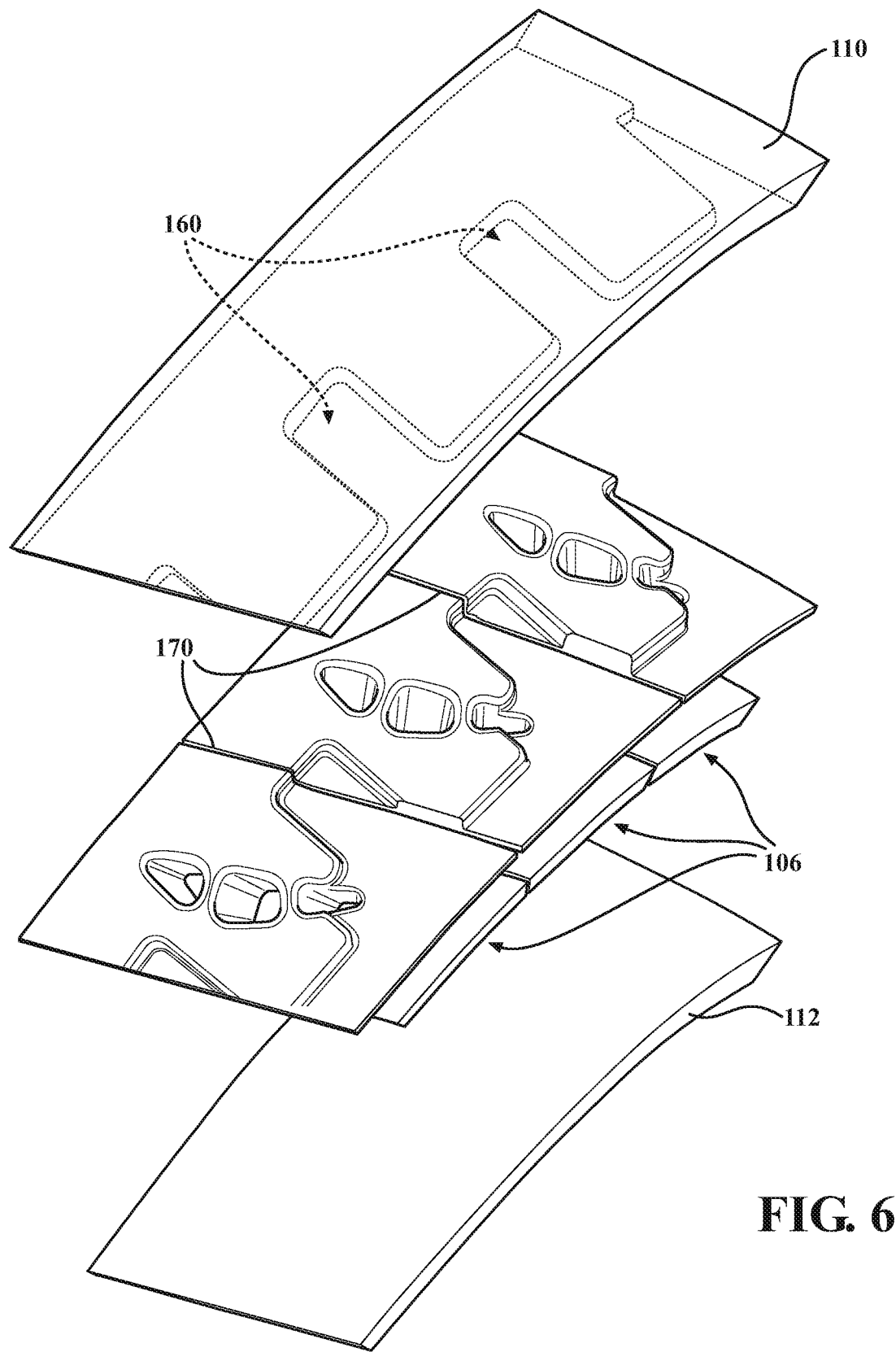
FIG. 6 is an enlarged perspective partial phantom view of the turbine vane ring.

The attachment faces 150, 152, 154, 156 are generally formed by thickened areas of the outer vane endwall 80 or other features such as tabs that are arranged to form these faces and interface with respective attachment faces formed by the associated outer structural support 110 (FIG. 6). In this disclosed non-limiting embodiment, the outer structural support 110 includes a series of lugs 160 provide tangential reaction faces that may be angled with respect to the engine axis A and extend transverse to a respective circumferential interface 170 between each airfoil fairing shell 106 (FIG. 6, 9, 10). Alternatively, the series of lugs 160 provide tangential reaction faces is parallel to the engine axis (FIG. 7).

The attachment faces 150, 152, 154, 156 are arranged to transmit loads between the respective structural supports 110, 112 and the airfoil fairing shell 106. The surface of the thickened area of the airfoil fairing shell 106 forms the radial attachment face 150 that is clamped between the outer and inner structural support 110, 112.

Figure 9:
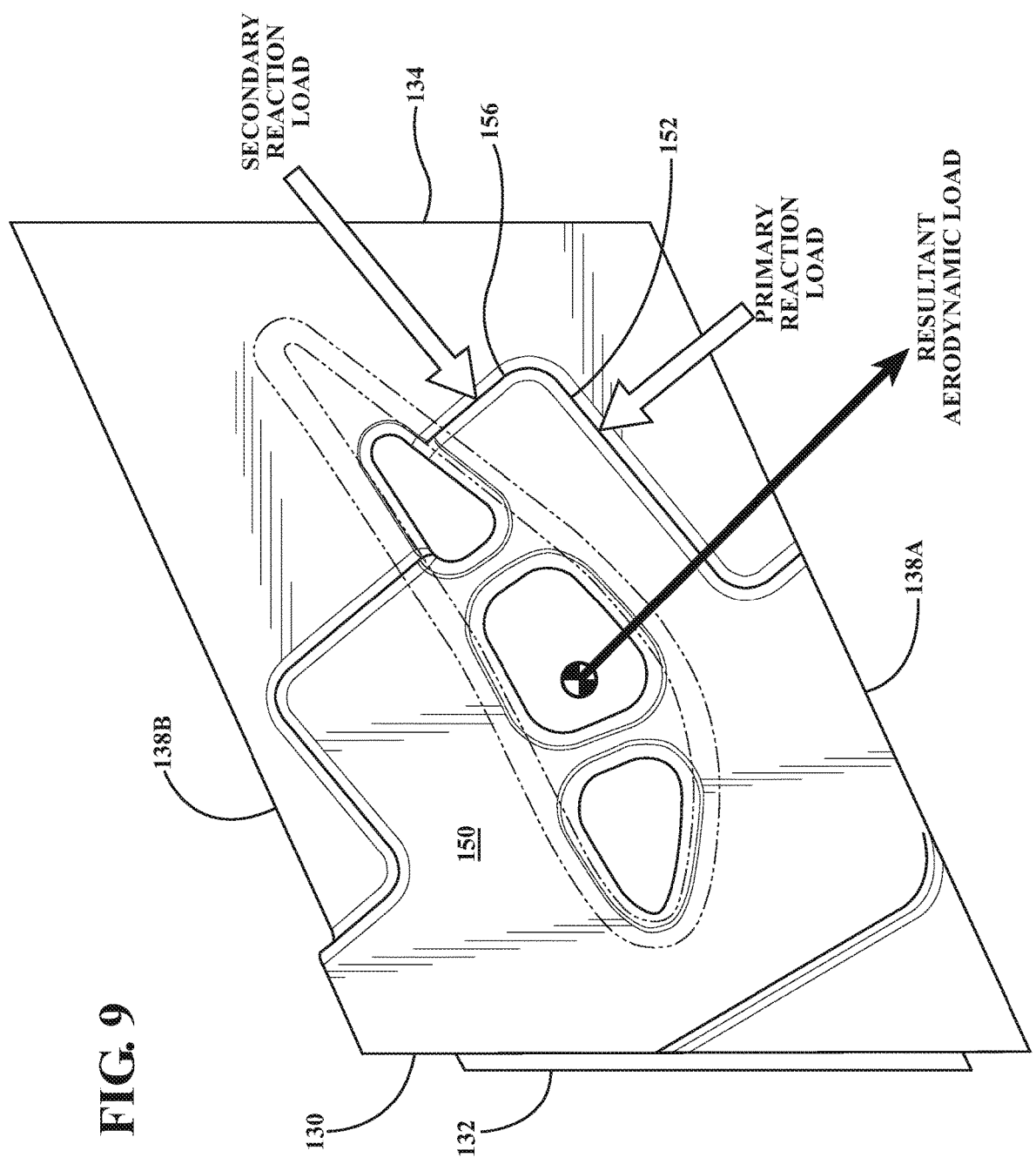
FIG. 9 is a top partial phantom view of an airfoil fairing shell according to another disclosed non-limiting embodiment.

The attachment faces 152, 154, 156 react in-plane loads formed by the step transitions of the thickened areas of the outer vane endwall 80. The attachment faces 152, 154, 156 may be aligned with the axial and tangential directions or rotated to an arbitrary angle, such as that which presents a large face perpendicular to the resultant aerodynamic load (FIG. 9). The suction side tangential attachment face 152 is tasked with reacting aerodynamic in-plane loads and may be located downstream, and to the suction side of the aerodynamic center "C" of the airfoil such that aerodynamic loads tend to create compressive rather than tensile loads in the material that are in the plane with the platform between the aerodynamic center "C" to the attachment faces. That is, the suction side tangential attachment face 152 interfaces with one of the series of lugs 160 of the structural support 110 to provide a primary reaction load. The axial attachment face 156 also interfaces with the structural support 110 to provide a secondary reaction load.

Figure 11:
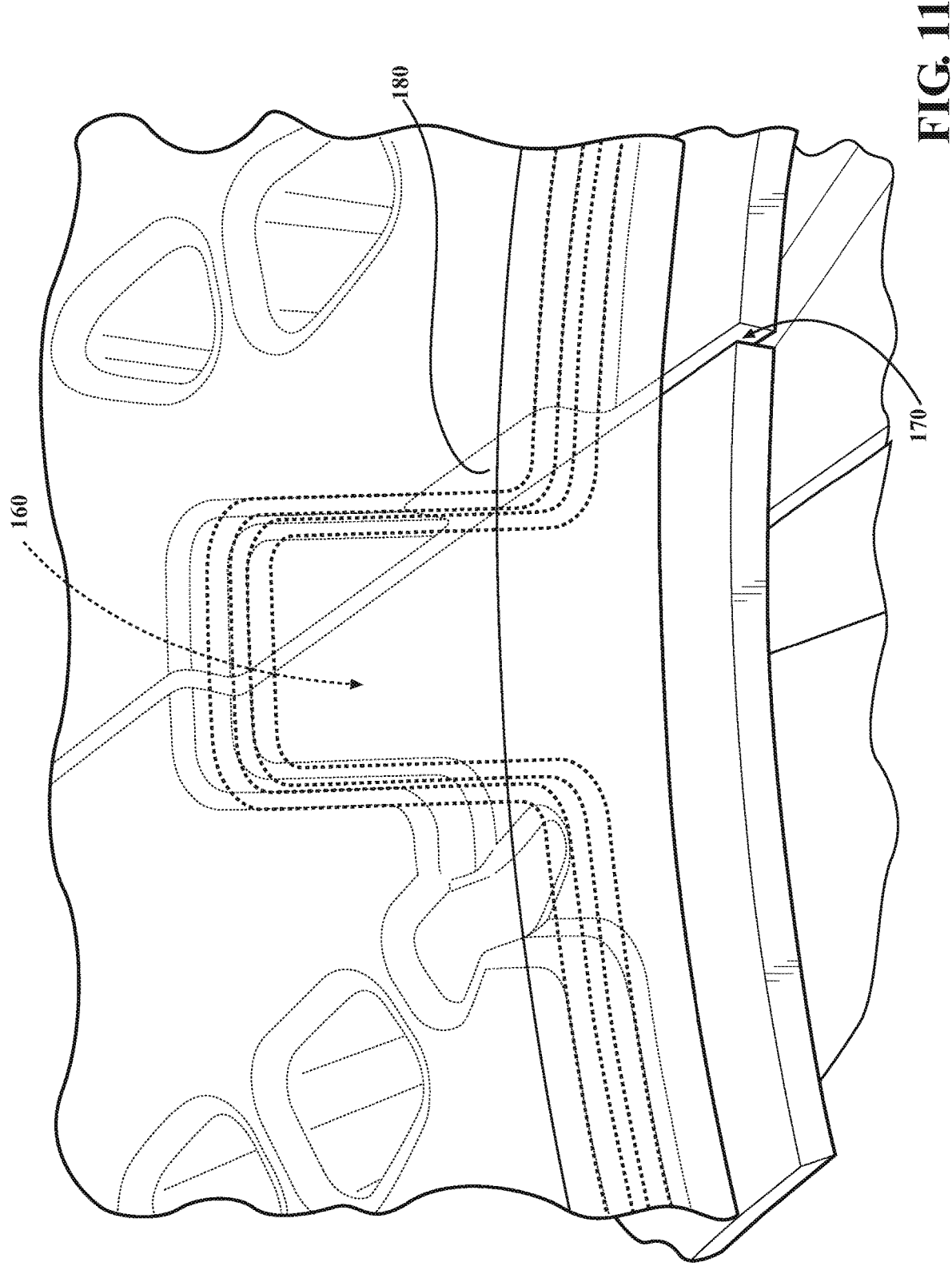
FIG. 11 is a top partial phantom view of an airfoil fairing shell according to another disclosed non-limiting embodiment.

In this disclosed non-limiting embodiment, the primary reaction load and the secondary reaction load are non-parallel to the resultant aerodynamic load from the aerodynamic center "C" as generated by the airfoil 72, and the suction side tangential attachment face 152 is non-parallel to the matefaces 138A, 138B. Here, the suction side tangential attachment face 152 and the pressure side tangential attachment face 154 are perpendicular to the forward edge 130 and the aft edge 134. In this disclosed non-limiting embodiment, a corner 180 at the interface between the suction side tangential attachment face 152 and the axial attachment face 156 is chamfered. The chamfered corner 180. The purpose of such a chamfer allows the load bearing faces on the stator shell to clear the edges of the complementary faces' fillet at their junction on the structural platform to prevent contact stress concentration (FIG. 11).

In another disclosed non-limiting embodiment, the primary reaction load is parallel to a resultant aerodynamic load from an aerodynamic center as generated by the airfoil and the suction side tangential attachment face 152 is non-parallel to the matefaces 138A, 138B (FIG. 9). Notably, the primary and secondary load transmitting faces (alternatively called the axial and tangential faces when these faces are not angled with respect to the engine axis) are always perpendicular to each other, regardless of whether or not one of them is aligned to the resultant loading direction.

Figure 10:
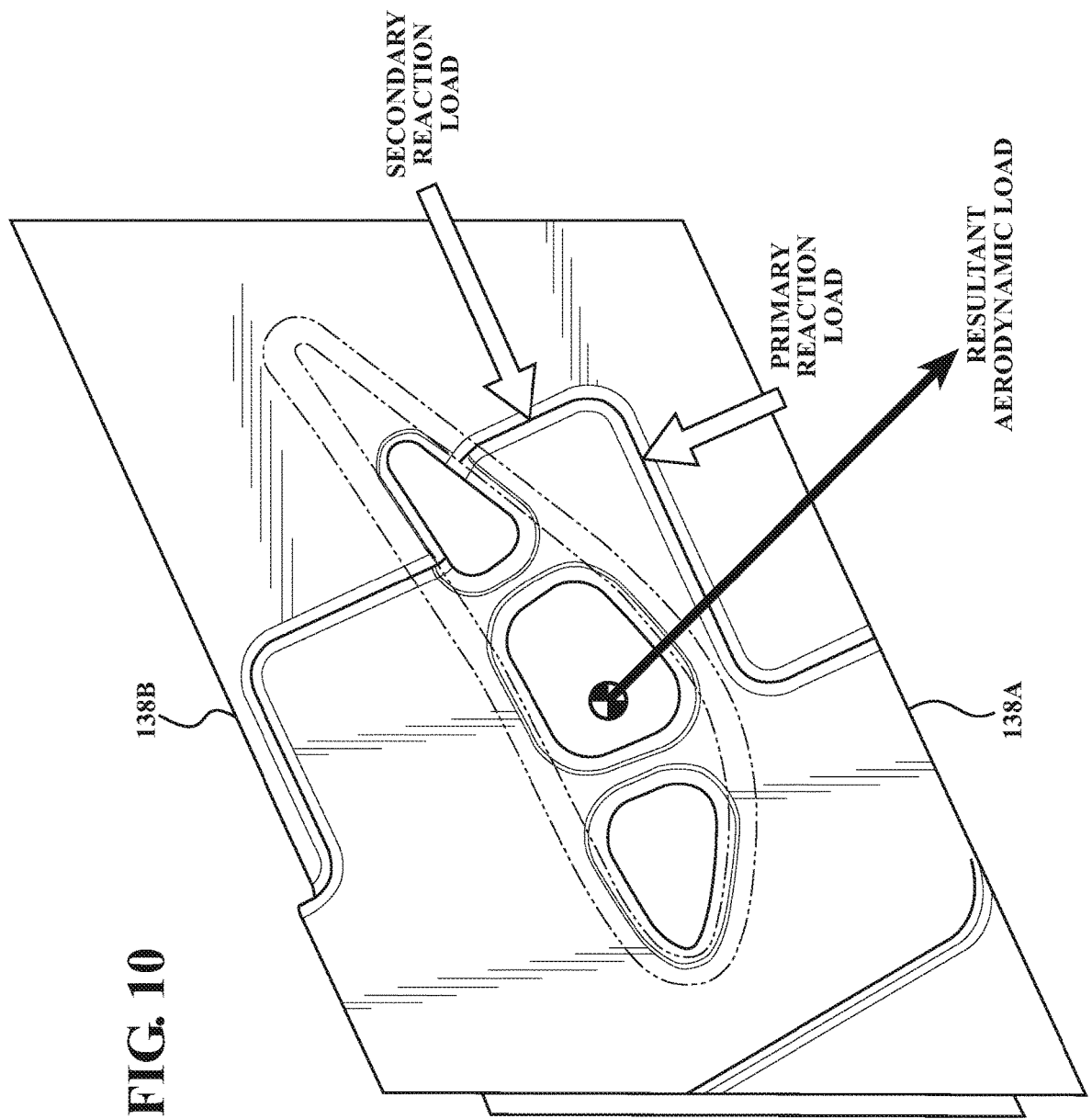
FIG. 10 is a top partial phantom view of an airfoil fairing shell according to another disclosed non-limiting embodiment.

In another disclosed non-limiting embodiment, the suction side tangential attachment face 152 and the pressure side tangential attachment face 154 are generally parallel to the matefaces 138A, 138B of the outer vane endwall 80 (FIG. 10). Such arrangements may facilitate assembly into the engine 20.

The attachment faces 150, 152, 154, 156 enable the use of separate structural platforms for a turbine stator which itself has an airfoil and endwalls while limiting tensile stresses in the plane of the platform.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. An airfoil fairing shell for a gas turbine engine comprising:
   an airfoil section that extends from an outer vane endwall that comprises a forward edge and an aft edge with matefaces that extend between the forward edge and the aft edge, the endwall comprises a radial attachment face, a suction side tangential attachment face, a pressure side tangential attachment face, and an axial attachment face,
   wherein the radial attachment face forms a thickened area spaced from an inner face of the outer vane endwall defined by the suction side tangential attachment face, the pressure side tangential attachment face, and the axial attachment face which is transverse thereto, the forward edge thicker than the aft edge and the forward edge defines the thickness of the suction side tangential attachment face, the pressure side tangential attachment face, and the axial attachment face;
   wherein the suction side tangential attachment face, the pressure side tangential attachment face, and the axial attachment face extends from the inner face to the radial attachment face to form a stepped surface.

2. The airfoil fairing shell as recited in claim 1, wherein the airfoil section comprises a single airfoil.

3. The airfoil fairing shell as recited in claim 1, wherein the airfoil fairing shell is radially clamped by an outer structural support and an inner structural support.

4. The airfoil fairing shell as recited in claim 1, wherein a corner at an interface between the suction side tangential attachment face and the axial attachment face is chamfered.

5. The airfoil fairing shell as recited in claim 4, wherein the chamfered corner allows a load bearing face on a stator shell to clear an edge of a complementary face fillet at their junction on a structural platform to prevent contact stress concentration.

6. The airfoil fairing shell as recited in claim 1, wherein the suction side tangential attachment face and the pressure side tangential attachment face are perpendicular to the forward edge and the aft edge.

7. The airfoil fairing shell as recited in claim 1, wherein the axial attachment face and the tangential attachment faces are perpendicular to each other.

8. The airfoil fairing shell as recited in claim 7, wherein the axial attachment face and the tangential attachment faces are angled with respect to the engine axis.

9. The airfoil fairing shell as recited in claim 7, wherein the axial attachment face and the tangential attachment faces are not angled with respect to the engine axis.

10. The airfoil fairing shell as recited in claim 1, wherein the endwall is an outer vane endwall.

11. The airfoil fairing shell as recited in claim 1, wherein the endwall is an inner vane endwall.

12. The airfoil fairing shell as recited in claim 1, further comprising a series of lugs of a structural support wherein each lug of the series of lugs are generally rectilinear.

13. The airfoil fairing shell as recited in claim 1, wherein the axial attachment face is a stepped surface that is of the thickness defined by the forward edge.

14. The airfoil fairing shell as recited in claim 1, wherein the suction side tangential attachment face located downstream and to a suction side of an aerodynamic center "C" of the airfoil to interface with one of a series of lugs of a structural support to react aerodynamic in-plane loads such that the aerodynamic loads tend to create a compressive rather than tensile loads in a plane with the endwall;
   the pressure side tangential attachment face transverse to the forward edge and the aft edge; and
   the axial attachment face interfaces with the structural support to provide a secondary reaction load.

15. An airfoil fairing shell for a gas turbine engine comprising:
   an airfoil section that extends from an outer vane endwall that comprises a forward edge and an aft edge with matefaces that extend between the forward edge and the aft edge, the endwall comprises a suction side tangential attachment face transverse to the forward edge and the aft edge, the suction side tangential attachment face located downstream and to a suction side of an aerodynamic center "C" of the airfoil to interface with one of a series of lugs of a structural support to react aerodynamic in-plane loads such that the aerodynamic loads create a compressive rather than tensile loads in a plane with the endwall, wherein the radial attachment face forms a thickened area spaced from an inner face of the outer vane endwall, the thickened area defined by the suction side tangential attachment face, the pressure side tangential attachment face, and the axial attachment face which is transverse thereto, the suction side tangential attachment face, the pressure side tangential attachment face, and the axial attachment face extends from the inner face to the radial attachment face.

16. The airfoil fairing shell as recited in claim 15, wherein a corner at an interface between the suction side tangential attachment face and an axial attachment face is chamfered.

17. The airfoil fairing shell as recited in claim 16, wherein the chamfered corner allows the load bearing faces on the stator shell to clear an edge of a complementary face fillet at their junction on the structural platform to prevent contact stress concentration.

18. The airfoil fairing shell as recited in claim 15, wherein the suction side tangential attachment face and a pressure side tangential attachment face are perpendicular to the forward edge and the aft edge.

19. The airfoil fairing shell as recited in claim 15, wherein an axial attachment face and the tangential attachment faces are perpendicular to each other.

20. The airfoil fairing shell as recited in claim 19, wherein the axial attachment face and the tangential attachment faces are angled with respect to the engine axis.

21. The airfoil fairing shell as recited in claim 19, wherein the axial attachment face and the tangential attachment faces are not angled with respect to the engine axis.

22. The airfoil fairing shell as recited in claim 15, further comprising a pressure side tangential attachment face parallel to the suction side tangential attachment face.

23. The airfoil fairing shell as recited in claim 22, wherein the pressure side tangential attachment face is transverse to the forward edge and the aft edge.

24. The airfoil fairing shell as recited in claim 22, wherein the axial attachment face extends from the inner face to the radial attachment face to form a stepped surface.

* * * * *